(12) United States Patent
Strength et al.

(10) Patent No.: US 6,787,212 B2
(45) Date of Patent: Sep. 7, 2004

(54) COMPOSITE CAMOUFLAGE CONSTRUCTION AND METHOD FOR MANUFACTURING COMPOSITE CAMOUFLAGE CONSTRUCTION

(75) Inventors: John D. Strength, Spartanburg, SC (US); Robert G. Champion, Spartanburg, SC (US); James Robert Reynolds, Spartanburg, SC (US); Raymond H. Pettit, Jr., Greenwood, SC (US); William L. McLeod, Jr., Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 51 days.

(21) Appl. No.: 10/365,252

(22) Filed: Feb. 12, 2003

(65) Prior Publication Data

US 2004/0157038 A1  Aug. 12, 2004

(51) Int. Cl.[7] ................................................. B32B 3/06
(52) U.S. Cl. ........................ 428/102; 428/919; 156/61; 156/85; 156/93
(58) Field of Search ................................ 428/102, 919, 428/17; 156/85, 93, 61

(56) References Cited

U.S. PATENT DOCUMENTS 4,931,320 A   6/1990  Leonard
5,013,375 A   5/1991  Leonard
5,281,451 A   1/1994  Reynolds
5,476,561 A  12/1995  Bylund et al.
5,486,385 A   1/1996  Bylund et al.

OTHER PUBLICATIONS

Website advertisement for "3D REAL LEAF"™ product manufactured and distributed by Robinson Outdoors, Inc., Feb. 4, 2003.

Primary Examiner—Alexander S. Thomas
(74) Attorney, Agent, or Firm—Terry T. Moyer; Jeffery E. Bacon (57) ABSTRACT

An improved camouflaged product and method of making such a product is disclosed. A multi-layered camouflage construction may comprise a first textile substrate and a second textile substrate secured to each other along parallel lines of stitching. The second textile substrate may be cut to form lobes oriented transversely to the lines of stitching to simulate the appearance of natural objects in the terrain, such as leaves or foliage. Thread which is capable of shrinking is used to attach textile substrates to each other, and then the thread is heated to shrink the thread into the stitch, forming a hardened seam with gathering and bunching of one or more substrates along the seam. Gathering of substrate along a seam contributes to the three-dimensional visual effect of the camouflage construction.

40 Claims, 7 Drawing Sheets

COMPOSITE CAMOUFLAGE CONSTRUCTION AND METHOD FOR MANUFACTURING COMPOSITE CAMOUFLAGE CONSTRUCTION

BACKGROUND OF THE INVENTION

Camouflaged materials are used to conceal objects, personnel, and equipment in natural terrain. Camouflaged materials may be provided in the form of drapable sheets or net structures of varying shapes and sizes. Camouflaged materials in some instances may be a solid color. In other applications, such materials may be dyed or printed in multiple patterns to simulate the coloration or texture of the terrain in which the camouflage is utilized. Typical examples of colors that may be employed include various patterns of black, brown, and green, The disclosure of U.S. Pat. No. 5,486,385 describes a composite product including an open mesh net substrate which is bonded to a sheet material such as a woven fabric, non-woven fabric, knit fabric, or the like. The sheet is colored in a desired camouflage pattern, bonded to the substrate along spaced lines of attachment, and cut to simulate the appearance of natural objects of the terrain. Separate lobes are formed in the sheet to simulate the appearance of natural objects in the terrain, such as leaves or foliage. Then, the lobes are heated as much as 400 degrees Fahrenheit to wrinkle and deluster the camouflage lobes.

To improve the camouflage characteristics of such composites, it is desirable to introduce three-dimensional effects to the materials. That is, wrinkling or gathering of the materials is desirable, and results in a visual effect that more closely simulates natural terrain. Methods and products that result in a more highly wrinkled and a greater three-dimensional effect upon the structure are desirable.

Robinson Laboratories, Inc. of 110 North Park Drive, Cannon Falls, Minn. 55009 distributes commercially a camouflaged product designated "3D REAL LEAF"™. This product is said to provide a layered composition having a first backing layer and a second leafy layer that is stitched to the backing layer. It is believed that a differential feed rate is employed in the construction of this product to provide a bunching of material along stitched seams.

The durability and tightness of the stitching in camouflage composite constructions is an important factor in the overall effectiveness of the camouflage composite. Camouflaged materials typically are used outdoors in rugged environments. Therefore, a construction that is physically strong, durable, and provides maximum three-dimensional effect is highly desirable. The durability of the three-dimensional effect depends upon the stitch or thread maintaining its position relative to other layers of the construction. A stitched seam of thread preferably should provide a high degree of structural integrity to maintain its physical form during use, thereby providing maximum three-dimensional effects to the composite fabric construction. It is therefore desirable to provide a thread for stitching that will exhibit superior strength and resist elongation of the composite construction along the seam. A thread for stitching that is adapted to maintain or enhance three-dimensional gathering effects along a seam also is desirable. A seam that will show a high degree of resistance to breakage when opposed fabric layers are subjected to a separating force also would be desirable.

BRIEF DESCRIPTION OF THE DRAWINGS

A full and enabling disclosure of this invention, including the best mode shown to one of ordinary skill in the art, is set forth in this specification.

The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

Surprisingly, it has been discovered that by modifying certain commercially available yarn, a new high-shrink material may be formed which shrinks upon application of heat. This material may be used as a yarn, or as a thread. In the application of the invention, it has been found that use as a thread is very useful, to connect two or more textile substrates, as further described herein. Such a thread may be employed in a stitch to connect a number of textile substrates, thereby forming a connected composite textile construction. Upon the application of heat to the composite construction with shrinkable thread, a shrink-hardened seam may be formed along the stitch. Shinkage amounts of such thread may be as much as 70% of the actual thread length, as further described below. The number of stitches per linear inch in the composite construction upon heating may increase as well (due to thread shrinkage, primarily), by as much as 10–20%.

Conventional textile and sewing applications employ a thread or yarn which exhibits very little shrinkage after it is applied in a stitch. That is, shrinkage of thread typically is intentionally avoided in the manufacture of textile articles.

However, in the application of the invention, a high degree of shrinkage is desirable to form a shrink-hardened seam connecting at least two textile substates. Upon forming a layered composite by stitching with the high-shrink thread, and subsequently heating the composite construction, the thread length decreases and therefore tightens against the joined substrate layers, which serves to maximize the amount of bunching or gathering of such mated textile substrates.

A maximum amount of bunching or gathering increases the visual three-dimensional effect of the fabric. Thus, high shrink thread may be employed to achieve a shrink-hardened seam in camouflage fabrics to maximize the visual performance of such fabrics.

For purposes of this specification, materials used for stitching two separate pieces of textile to each other shall be referred to herein as "thread" and not "yarn". However, the invention may be applied in the use of such high shrink materials in "yarn" applications as well as in thread applications. In general, for purposes of this description, a yam is described as a textile useful for manufacture of a sheeted material, while a thread is used as a connecting mechanism for one or more sheeted materials. Furthermore, the use of the "textile" shall not be limited to sheet or woven materials, and may include as well flexible films, such as for example, urethane films and the like.

In one application of the invention, it is possible to provide a multi-layered camouflage construction having three-dimensional qualities with reduced luster and increased gathering or wrinkling. The camouflage construction may closely approximate the visual appearance of terrain. The construction may comprise two substrates mated to each other and stitched along their length using high-shrink thread. The thread subsequently may be heated to bunch or gather the fabric along the stitched seam, thereby forming a shrink-hardened seam. Thus, a gathered three-dimensional appearance may be formed in either or both of the first or second substrate, depending upon the particular application, and the amount of gathering necessary in the particular composite being manufactured.

This bunching or gathering effect also may be achieved in two directions which are perpendicular to each other (i.e.

cross and machine direction) upon the substrate, using techniques further described below. Furthermore, in the application of the invention it is not necessary or desirable to use different running speeds of the first substrate relative to the second substrate to achieve gathering or bunching in the final composite construction.

A first textile substrate, also known as a "base" fabric, may be stitched to a second textile substrate. The second textile substrate may comprise leaf-shaped nodes as further described below. The so-called base fabric may be heatset fabric, or non-heatset fabric, depending upon whether or not it is desired to shrink the base fabric further using heat once the composite is manufactured. That is, the base fabric itself also may be made to shrink, and this effect is especially pronounced in the applications which use non-heatset base fabric. Shrinkage of thread along a seam is desired, in many applications. Other applications of the invention, however, may employ elastic or elastic-containing materials to achieving bunching or gathering along a seam, including for example materials such as LYCRA™ (believed to be a trademark of the DuPont Company of Wilmington, Del.).

The second textile substrate from which nodes or leaf-shaped material is to be cut can be dyed, printed, or greige fabric. A lightweight 100% polyester woven fabric is believed to be very advantageous, but other fabrics and fibers may be employed as well, including poly/cotton blends, knits, non-wovens, and the like.

The thread employed to stitch together and form a shrink-hardened seam connecting the above referenced two textile substrate layers may be selected from many different thread types. One particularly advantageous thread type is a high shrink solution dyed polyester thread.

In one preferred application, the thread is applied in a chain stitch at a rate of about 5 to about 20 stitches per inch, most preferably about 10 stitches per inch. The size or denier of the thread plays an important role in the practice of the invention. A greater thread size used in a composite is believed to provide an enhanced gathering strength within the composite. Therefore, thread shrinking is directly related to the amount of bunching or gathering of material that may be achieved along a seam. Thus, thread size may affect the overall three-dimensional textile appearance and performance of a camouflage composite construction.

Figure 1:
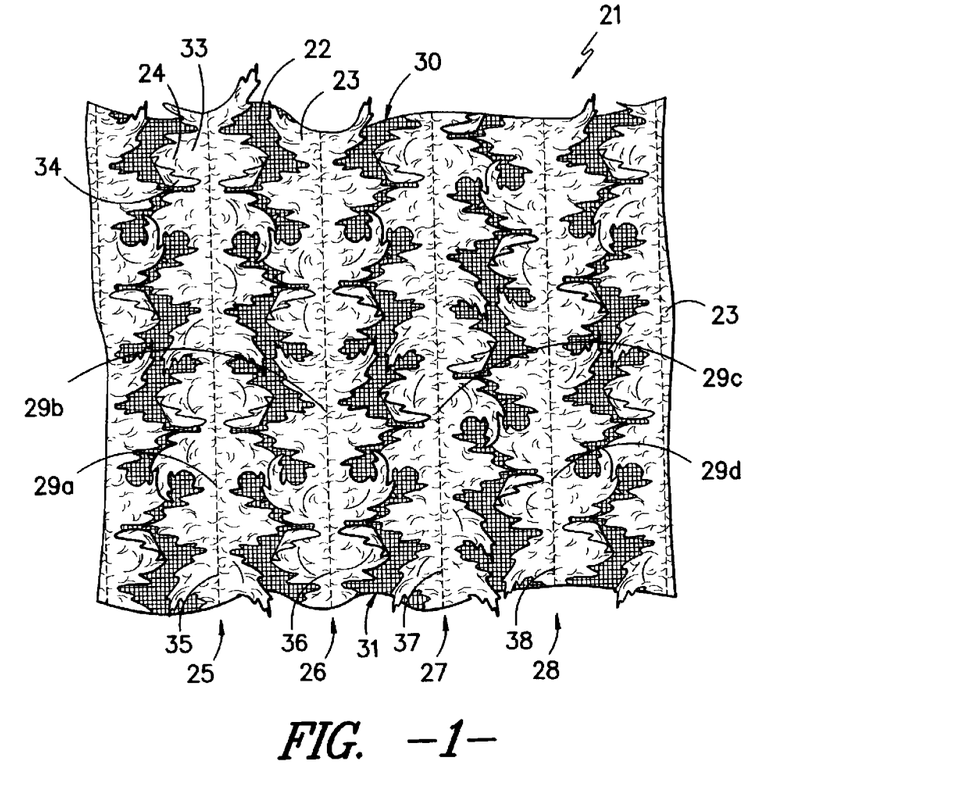
FIG. 1 shows a plan view of a first embodiment of the composite construction of the invention which employs a net mesh backing material as a first textile substrate in the camouflage construction, the construction including spaced parallel seams running vertically in the machine direction of the construction.

Referring to the drawings, FIG. 1 shows a first embodiment of the invention which comprises a multi-layered camouflage construction 21. The camouflage construction 21 is comprised of a first textile substrate 22 and a second textile substrate 23 which overlays the first textile substrate 22. The first textile substrate 22 comprises a first end 30 and a second opposite end 31. In this particular embodiment, the first textile substrate 22 is of an open mesh type, as seen in FIG. 1. The second textile substrate 23 provides a plurality of transversely orientated lobes 24 which are aligned along first line of attachment 25, second line of attachment 26, third line of attachment 27, and fourth line of attachment 28, as examples. FIG. 1 shows only a partial view of the entire fabric that could be manufactured, and the number of separate lines of attachment which could be used will vary depending on the particular application. Each lobe 24 includes a base portion 33 which is connected to a line of attachment 25, and an outer wrinkled in portion 34 which is directed towards an opposite line of attachment. In this way, the lobes are oriented towards each other, and in alternating sequence, so they substantially cover, but do not completely cover, the first textile substrate 22.

FIG. 1 illustrates the bunching or gathering of the first textile substrate 22 and the second textile substrate 23 which may be effected in several ways, at least one of which is described herein. The bunching or gathering of the first textile substrate 22 provides advantageous three-dimensional visual characteristics that contributes to the effectiveness of the camouflage construction 21 in sumulating terrain. In the particular embodiment of FIG. 1, the bunching or gathering of the first textile substrate 22 is provided along the length of the first thread 35 along the first line of attachment 25 into a shrink-hardened seam 29a, and by a second thread 36 along the second line of attachment 26, which runs along shrink-hardened seam 29b. Further, a third thread 37 is provided along the third line attachment 27 to form shrink-hardened seam 29c, and the fourth thread 38 along the fourth line of attachment 28 forms a shrink-hardened seam 29d.

Figure 2:
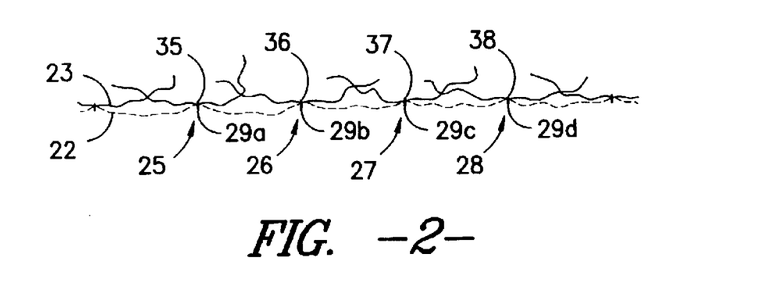
FIG. 2 shows an end view of the camouflage construction seen in FIG. 1.

FIG. 2 illustrates an end view of the first embodiment of the invention previously seen in FIG. 1. In FIG. 2, the multi-layered camouflage construction 21 is a multi-layered composite. The first textile substrate 22 is seen underneath, while the first thread 35, second thread 36, third thread 37, and fourth thread 38 are shown in cross section at the point at which they attach the first textile substrate 22 to the second textile substrate 23. This attachment occurs at the lines of attachment 25–28, respectively. Furthermore, the second textile substrate 23 is seen projecting upwards to provide a three-dimensional effect upon the overall camouflage construction 21. The shrink-hardened seams 29a–d are seen in cross-section in the FIG. 2.

Figure 3:
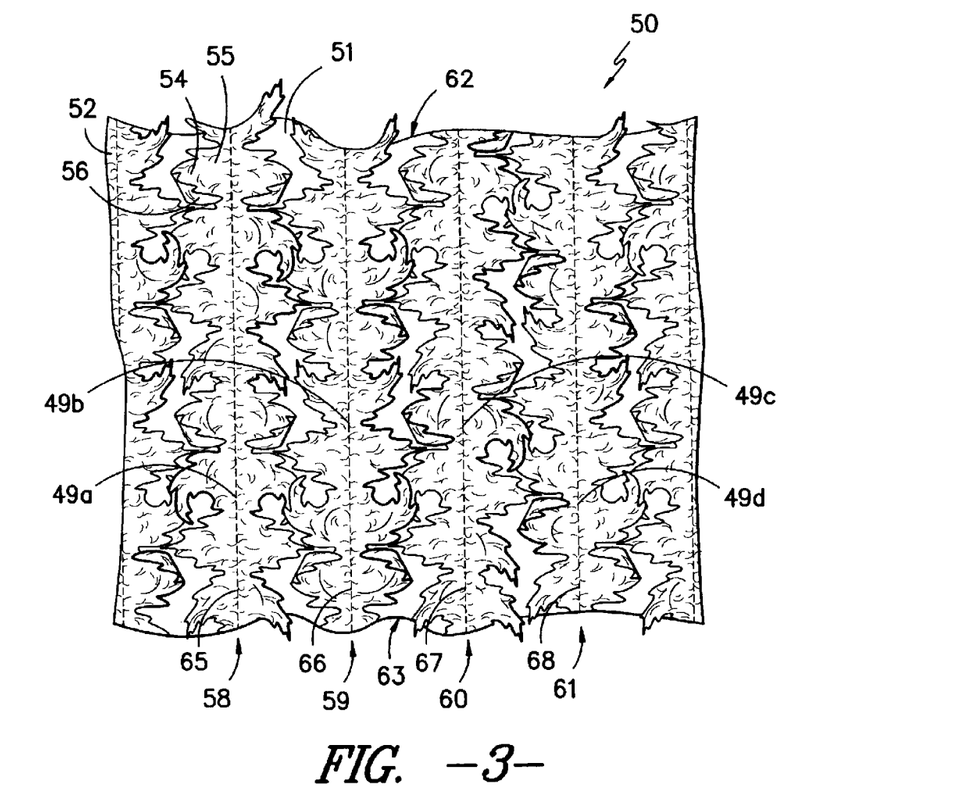
FIG. 3 depicts a second embodiment of the invention which employs a solid first textile substrate backing material, also containing vertically oriented parallel seams.

FIG. 3 illustrates a second embodiment of the invention in which a multi-layered camouflage construction 50 is comprised of a first textile substrate 51 (with first end 62 and second end 63) that is solid in form (as opposed the mesh net configurations of FIGS. 1–2), and a second textile substrate 52. In the particular example of FIG. 3, the first textile substrate comprises a solid poly-cotton material, but other solid sheets of material can also be used, as further described herein. A plurality of lobes are provided, including for example lobe 54 having a base portion 55 connected to third line of attachment 60, and a outer wrinkled end portion 56 which projects above the first textile substrate 51.

From left to right as seen in FIG. 3, a first line of attachment 58, a second line of attachment 59, a third line of attachment 60, and a fourth line of attachment 61 extend parallel to each other from the first end 62 of the first textile substrate 51 to the second end 63 of the first textile substrate 51. Furthermore, the lines of attachment are formed by first thread 65 (which forms shrink-hardened seam 49a), second thread 66 (which forms shrink-hardened seam 49b), third thread 67 (which forms shrink-hardened seam 49c), and fourth thread 68 (which forms shrink-hardened seam 49d), respectively.

Figure 4:
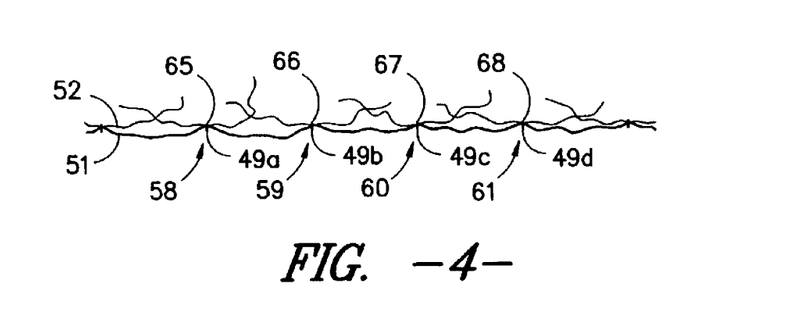
FIG. 4 shows an end view of the camouflage construction seen in FIG. 3.

FIG. 4 illustrates an end view of the second embodiment of the invention of FIG. 3, showing the above recited features in end view.

FIGS. 5–8 illustrate manufacturing procedures employed to produce the multi-layered composite construction of the invention. U.S. Pat. Nos. 5,486,385; 5, 281,451; 5,013,375; 5,476,561; and 4,931,320; each relate to constructions and methods of making various embodiments of camouflage construction materials. Reference is therefore made to these granted patents for general information regarding the manufacture of such articles.

Delustering of camouflage net resulting in low degree of reflection makes the composite camouflage construction difficult to observe, and is therefore desirable. Furthermore, the melting and wrinkling of camouflage lobes results in greater air movement being possible through the net, with reference to the embodiment of FIGS. 1–2. This is particularly useful in applications of the construction as a drape or covering over large pieces of equipment, in which wind or air resistance may become a significant factor due to the large surface area exposed to wind. In clothing applications, air movement may contribute to comfort for the wearer. One additional means of wrinkling and delustering camouflage lobes is the application of heated pressurized gas streams to the camouflage.

Method and apparatus for producing the lightweight camouflage fabric in accordance with the present invention may be described by reference to FIGS. 5–8. In FIGS. 5–8, the multi-layered camouflage construction of FIGS. 1–2 is shown, by way of example. As seen in schematic side elevation view in FIG. 5, an indefinite length continuous sheet of material, such as a second textile substrate 23, and an indefinite length web of the first textile substrate 22 (such as a knitted mesh fabric in this instance) are directed from supply rolls 124, 126 respectively by suitable guide means, such as rollers or bars 128. The substrates 22, 23 are provided in contiguous facing relation along the desired path of travel, as shown by the arrows in FIG. 5.

Spaced in the path of travel are bonding means, such as a sewing station 130 containing a plurality of individual sewing heads 131 spaced across the cross direction of the process or pathway. The second textile substrate 23 is stitched to the first textile substrate 22 along first, second, third and fourth lines of attachment 25–28 (see FIGS. 1–2).

Typically, the sewing means used is a Malimo RTM stitch-bonding machine, which is known in the industry. However, other machines could be employed, including for example straight-line quilting machines. Stitch-bonding of the sheet or second textile substrate 23 and first textile substrate 22 along plural lines of attachment during movement of the multi-layered camouflage construction 21 through the bonding means produces a plurality of continuous open-ended channels 132a–f (FIG. 8) in the composite bonded structure. Any number of stitches per inch may be employed, but it has been found that stitches applied at a rate of about 5–20 stitches per inch are advantageous. Furthermore the width of such open-ended channels 132a–f may be between about 1–10 inches, preferably about 2–3 inches. One very useful embodiment employs channels 132a–f having a width of about 3 and one-eighth inches.

Positioned in the path of travel of the composite bonded sheet and substrate after the sewing station 130 are multiple cutting means, located at a cutting station 134. As seen in FIGS. 5–8, cutting station 134 includes a plurality of generally U-shaped guides 136 mounted in spaced relation across the path of travel of the textile substrates 22,23 on cross member 137 of support frame 138. As the composite web moves in its longitudinal path of travel (see direction arrows in FIGS. 5 and 6), the guides 136 pass into each of the respective channels 132a–f (see FIG. 8) formed between adjacent lines of attachment 25–28 of the first and second textile substrates 22,23. Each U-shaped guide 136 is of sufficient thickness and height (FIG. 6) to separate and space the face of the second textile substrate 23 at a distance from the face of the first textile substrate 22.

Cutting means are mounted for reciprocating movement and positioned transverse to the path of travel of the substrates 22,23, shown as a plurality of electrically heated wires 140, each of which is mounted on cutters 142 of an insulator bar 144. Insulator bar 144 is attached by elevator mechanisms 145a–c to cross beam 146 on the support frame 38. The beam 146 is mounted on rods 147 for transverse reciprocation on frame 138, across the path (in the cross direction) of web travel. Beam 146 is, therefore, reciprocated by suitable drive means, such as for example pneumatically controlled programmed piston motor 148 (see FIG. 7).

Figure 6:
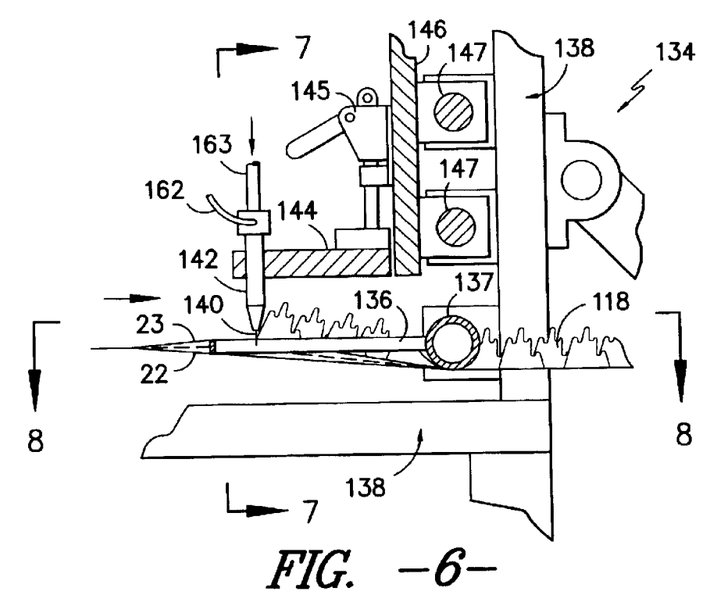
FIG. 6 is an enlarged side sectional elevation view of the cutting head of the cutting station of the apparatus of FIG. 5.
Figure 7:
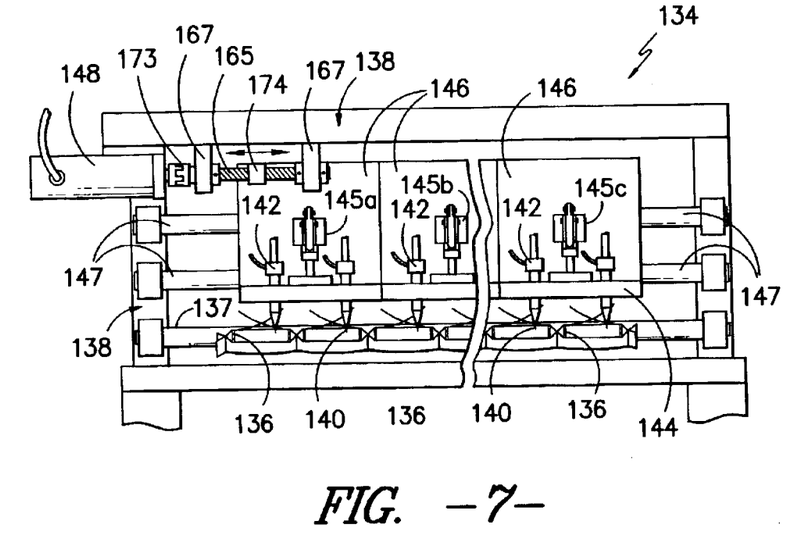
FIG. 7 is a front elevation view of a portion of the cutting head station of the apparatus of FIGS. 5 and 6, looking generally in the direction of arrows 7—7 of FIG. 6.
Figure 8:
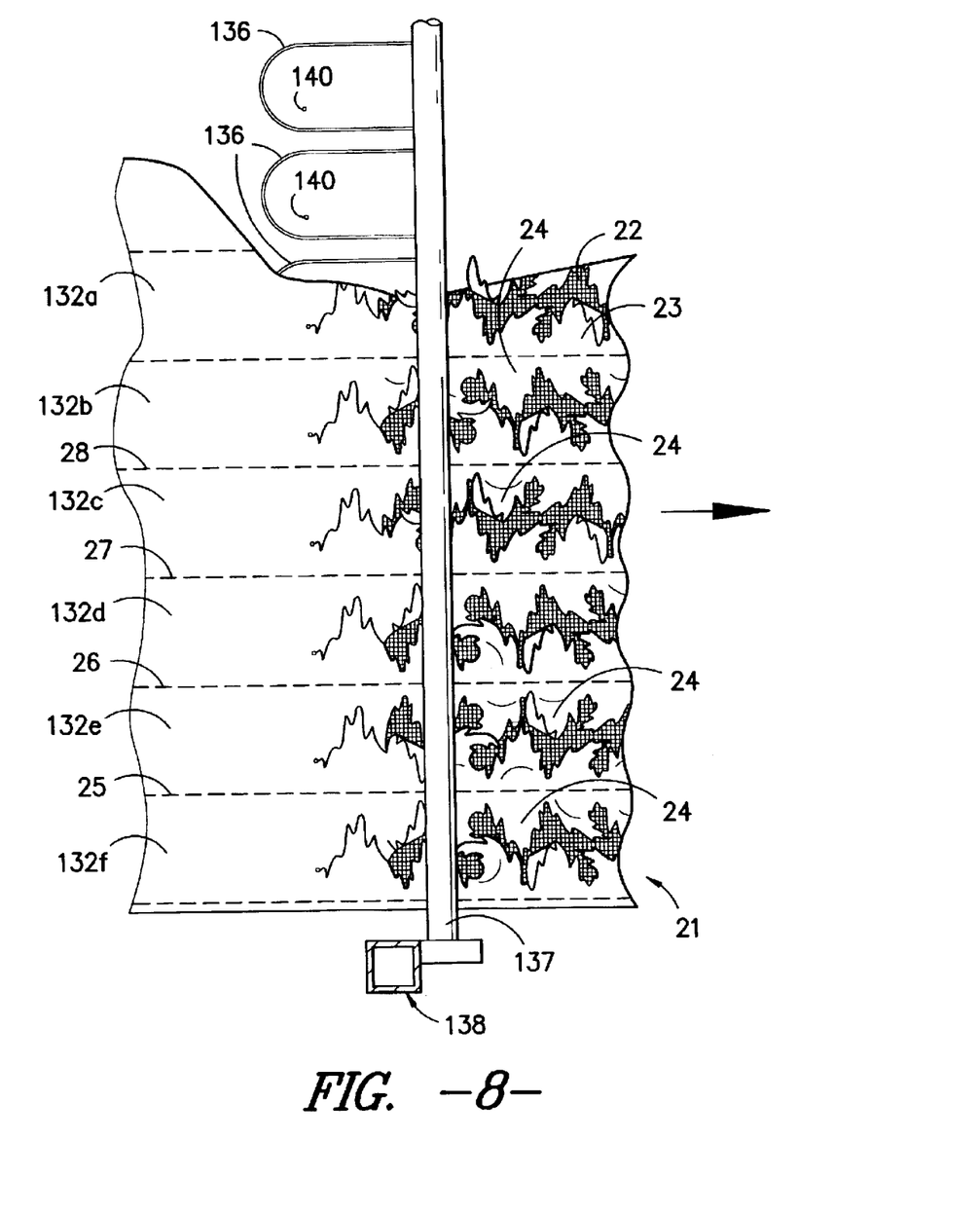
FIG. 8 is a top plan view of a portion of the cutting head of the cutting station of the apparatus of FIG. 5 taken generally along line 8—8 of FIG. 6, and looking in the direction of the arrows.

As best seen in FIGS. 6 and 7, each heated wire 140 extends downwardly to reside and reciprocate within the confines of each U-shaped guide member 136, moving very quickly to provide a movement that approximates the outline or exterior shape desired for construction of each lobe 24. Electrical energy is supplied from a suitable supply source to heat the wires 140 to a desired temperature to cut the continuous sheet fabric (or second textile substrate 23) without contacting or adversely affecting the supporting first textile substrate 22, which also is attached.

Cross beam 146 is reciprocated by a suitable drive means, such as motor 148 that is coupled to a ball screw 165 by means of a coupler 173. The ball screw 165 is rotatably attached to support frame 138 by means of a dual attachment members 167. The ball screw nut 174 is fixed to cross beam 46. As best seen in FIGS. 6 and 7, each electrically heated air cutter 142 extends downwardly to reside and reciprocate slightly above each U-shaped guide member 136. Electrical energy is supplied from a suitable supply source to electrical wire 162 to heat the inside of air cutter 142 to the desired temperature. In other applications (not shown in the Figures), a laser cutter could be employed. Furthermore, air is supplied from a suitable supply source to air conduit 163, which injects the air into the air cutter 142 to thereby cut by means of an air stream the continuous woven fabric 23 without cutting the supporting knitted mesh fabric 22, which is attached.

Operation of the motor 148 driving the ball screw 165 thus reciprocates the cross beam 146 holding each of the electrically heated air cutters 142 to move transversely back and forth slightly above each of their U-shaped guides 136 as the woven fabric 23 and knitted mesh fabric 22 move through the cutting station 134. The electrically heated air cutters 142 cut the woven fabric 23, between the adjacent lines of attachment 25–28, into a plurality of lobes 24, thus opening each of the channels 132a–f formed in the woven fabric 23 and knitted mesh fabric 22 as the multi-layered camouflage construction 21 passes through cutting station 134.

The shape and configuration of lobes 24 prior to heating may be varied, as desired, depending on the speed of movement through the cutting station 134 and the speed of reciprocation of the electrically heated air cutters 142. The speed of movement of the electrically heated air cutters 142 may be adjusted by adjustment of the servo motor speed. Various programming means well known in the art may be employed to provide varying and various patterns of lobes 24, as desired. Operation of the cutting station may be computer-controlled, but this is not required. Other embodiments may employ other means for cutting lobes, in which there is no cross beam 146, but instead each U-shaped cutting guide member 136 is configured for independent movement, thereby providing an opportunity for randomly cut leaf patterns along the composite. However, it should be recognized that other embodiments not specifically shown could employ techniques of cutting lobes or leaf-shaped portions in the second textile substrate prior to joining the second textile substrate to the first textile substrate, and therefore the invention is not limited to only those cutting and assembly methods and apparatus shown herein.

As shown in one desirable embodiment, electrically heated air cutters 142 are operated to provide a lobe configuration resembling a simulated leaf shape. The camouflage construction 21 may be suitably dyed or printed in a desired camouflage configuration of random coloration. The woven fabric 20 and knitted mesh fabric 22 preferably each may be dyed or printed prior to bonding to each other, and subsequent cutting.

Typically, the knitted mesh fabric 22 forming the net substrate which supports the second (woven) textile substrate 23 in the form of a continuous sheet may be dyed black, or a neutral background shade. It may be formed of essentially common textile material, including knit, polyester, or the like. The continuous sheet or second textile substrate 23 may be patterned in random green, brown, black coloration to conform to terrain in which the camouflage construction is employed. As mentioned, the particular mesh size of the net support substrate may be varied, but preferably it is sufficiently small size as to not snag on objects or equipment to be concealed. Similarly the distance between the lines of attachment of the sheet to the substrate may vary, depending upon the length and the size of the lobe desired for simulation of leaves or foliage, but about 2–6 inches has been found to work well, with about three and one-eighth inches being preferred.

The camouflage construction 21 leaving the cutting station 34 (see FIG. 5) is passed through guide rolls 151 and 152 and is directed downwardly to a creasing roll 154. This allows the lobes 24 to fall freely away from the mesh backing prior to passage through the heater 156.

Importantly, heater 156 applies energy to the underside of the multi-layered camouflage construction. The heater operates preferably in the range of 200–400 degrees. Fahrenheit. In the heater 156 the lobes tend to shrink while they curl away from the mesh 12, serving to increase the three-dimensional effect.

Figure 5:
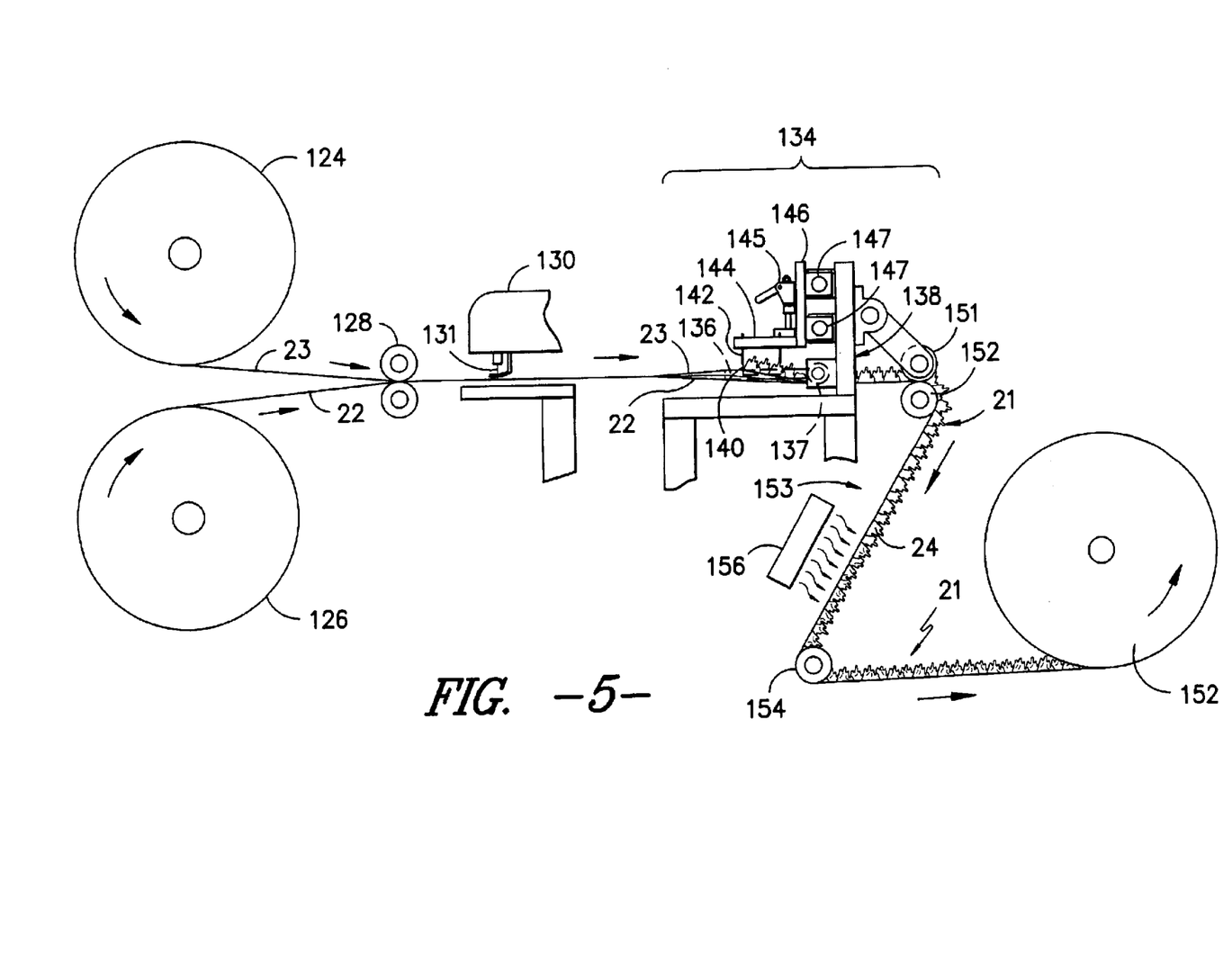
FIG. 5 is a side elevation view depicting schematically some of the principal components of the apparatus for producing the camouflage construction of the invention.

One important function of heating the underside or backside 53 of the multi-layered construction is that the threads 35–38 forming the lines of attachment 25–29 shrink substantially, thereby forming what is referred to herein as shrink-hardened seams 29a–d. The threads are particularly susceptible to infared radiation which is incident on the outer thread surface, as shown in FIG. 5. However, other heat sources which are not infared also could be employed in the invention. It is preferred that the processing speed be adjusted so that a particular thread portion may spend about 5 seconds at heater temperatures of between 250–400 degrees F. to faciliate full shrinkage effects. The exact temperature that is ideal in any given application will depend upon the materials used, the thread used, the denier of the thread, whether or not the thread is a multi-ply thread, and the like. Thread shrinkage amounts for one particularly useful thread is shown and discussed herein with respect to FIGS. 9–12, including both a technical description and a summary of testing of such thread.

The fabric 50 passes around the creasing roll 54 (see FIG. 5) with the curved lobes facing the roll so that crease lines 58 are formed in the lobes to produce the fabric 21 shown in FIG. 1. As can be seen in FIG. 1 the crease lines 58 are random so that the exposed portions of the lobes 24 are random. Furthermore, heating of the threads 35, 36, 37, and 38 along respective lines of attachment 25–28 results in formation of shrink-hardened seams 29a–d.

The multi-layered camouflage construction 21 may be suitable dyed or printed in a desired camouflage configuration of random coloration. The sheet or second textile substrate 23 and the first textile substrate 22 may be dyed or printed prior to bonding and cutting. Typically, the net substrate (first textile substrate 22) which supports the continuous sheet is dyed or printed black, partially black, while, tan, green, or a neutral background shade, depending upon the terrain to be simulated. The second textile substrate 23 may be patterned in random green, brown, and black coloration to conform to terrain in which the camouflage construction is employed.

The particular mesh size of the first textile substrate or net support backing 22 may be varied, but preferably it is sufficiently small in mesh size as to not snag on objects or equipment which is intended to be concealed. Similarly, the distance between the stitch lines of attachment of the sheet to the substrate may vary, depending upon the length and the size of the lobes desired for simulation of leaves or foliage in the terrain to be simulated. The net support backing 22 may be comprised of many different type of materials, including polyester, nylon, polypropylene, films, polyester copolymers, olefins, polyethylene, and other polymeric materials.

A textile substrate may be provided in an overfeed condition due to shinkage of the composite construction 21 in the machine direction as heating progresses. A feeding rate of about 6.9 yards per minute may be employed after the stitching is accomplished, at the point in FIG. 5 wherein the composite passes roll 151 and roll 152, and moves towards the above referenced heater 156. The web output beyond the heater (past the ironing roll 154) is typically at a rate of about 5.7 yards per minute.

Thus, the overall rate at which ironing roll 154 turns is about 17.4% faster than the rotation of roll 152 to accommodate for shrinkage in the machine direction that is observed when employing a high shrink thread as recited herein. This variation in web processing speed may be referred to as an overfeed.

Cold Drawn Thread Preparation

In the application of the invention, thread employed in sewing station 130 to produce camouflage construction 21 may be of many different types, and is not limited to any particular thread cited herein. Furthermore, some applications of the invention may use a single ply yarn, while other applications may use a two, three, four or more ply yarn as a base or starting material for thread construction. Yarn materials manufactured and distributed by Kosa, DuPont, Nanya (division of Formosa Plastics in Taiwan) and others could be employed in the practice of the invention. However, one particularly useful yarn which may be used in this application is purchased and then processed as further described below, prior to use. Materials including nylon, polyester, polypropylene, and others may be employed to construct a high strength thread capable of shrinking upon addition of heat, for application in the invention.

Two plies of Omara partially oriented polyester yarn (270 denier; 34 filament) may be employed and then modified in the practice of the invention. The Omara yarn employed for the particular examples as discussed herein is a solution dyed partially oriented (POY) polyester material, and it may be purchased from the manufacturer Omara Corporation.

The yam, after purchase, is modified by cold drawing at ambient temperature at a speed of about 400 meters/minute. Two plies of about 150 denier are intertangled to provide a thread for stitching. The thread is applied in sewing station 130. The stitch applied may be regular, irregular, continuous, or discontinuous. In some applications of the invention, no twist is provided in the thread, while in other applications twist is applied. In a preferred embodiment of the invention, a twist of less than about 1 turn per inch is applied, however, the invention is not limited to any particular amount of twist, or the presence of absence of twist in the thread. The thread then is capable of substantial shrinkage when subsequently exposed to heat, due to having been drawn cold. The substantial shrinkage upon application of heat generates the hardened seam of the invention, which has shown to be particularly useful in this application.

The hardened seams which result from the use of such cold drawn thread in the application of the composite construction is referred to herein as a "shrink-hardened" or "shrunk-hardened" seam, regardless of the specific type, size, or manufacturer that supplies the specific thread that is employed to manufacture such a hardened seam. In general, for purposes of this description, a "shrink-hardened seam" or "hardened seam" shall refer to any seam of thread in which the seam is stitched to connect two or more substrates, and then the thread is heated or otherwise energized to shrink the thread in place upon the substrates, resulting in a thread that is in tensioning relation to a substrate. Further, such a hardened seam causes the substate or fabric to which it is attached to become gathered or bunched along the seam. A shrink-hardened seam has been found to be particularly hardened and durable in such camouflage constructions, such a strong seam being configured for long life and low maintenance.

Testing of Cold Drawn Thread

Figure 9:
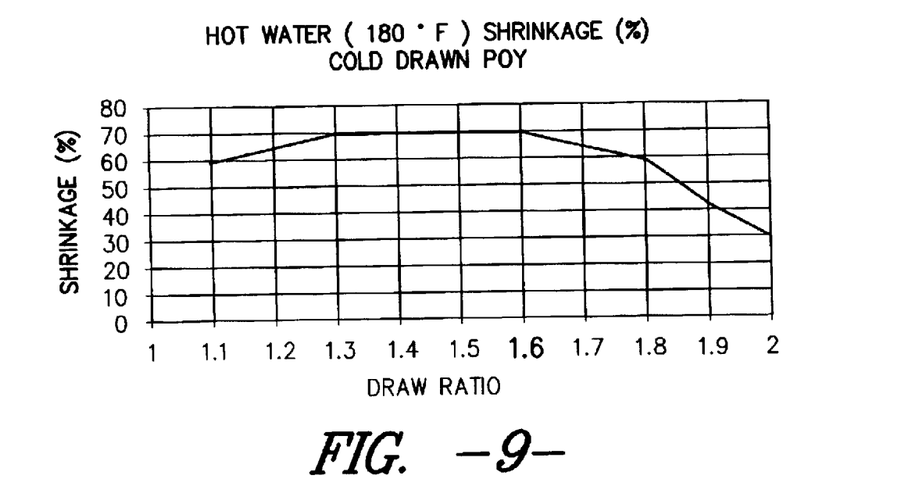
FIG. 9 illustrates properties of one preferred thread that may be used in the present invention, in which shrinkage % versus draw ratio of this particular cold drawn thread is presented.

Various testing was conducted for samples of cold drawn Omara thread as above described. FIG. 9 shows a shrinkage test to determine total shrinkage of the Omara cold drawn thread, and was accomplished according to ASTM 4031.

In general, the results of shrinkage testing of the Omara cold drawn thread indicate that thread run with a draw ratio of between about 1.3 and 1.6 exhibits the greatest degree of shrinkage (as much as 70% as shown in FIG. 9) and is thus the most desirable thread for this particular high-shrink application. Thus, a hardened seam may be produced with a maximum amount of bunching or gathering by use of such thread having such a draw ratio, for maximum three-dimensional effect.

Figure 10:
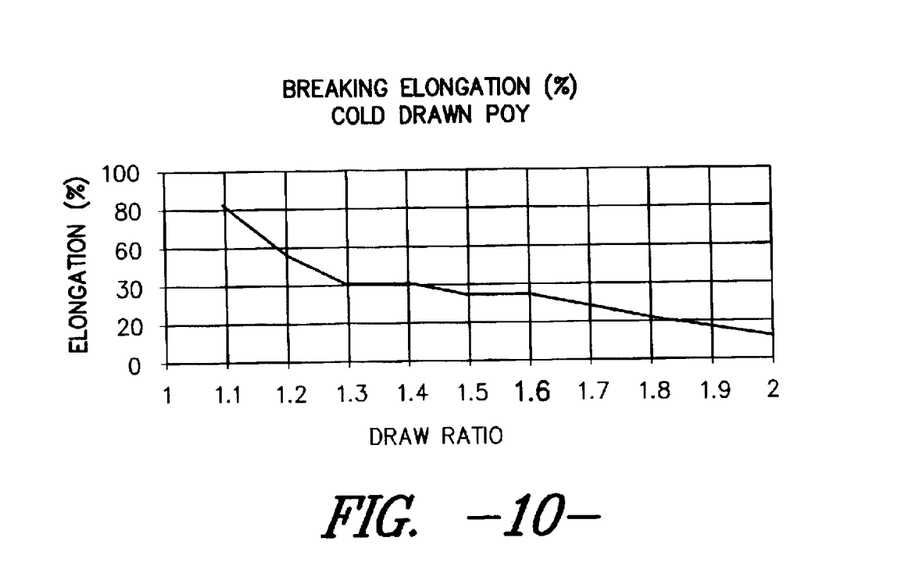
FIG. 10 shows breaking elongation of the thread presented in FIG. 9.
Figure 11:
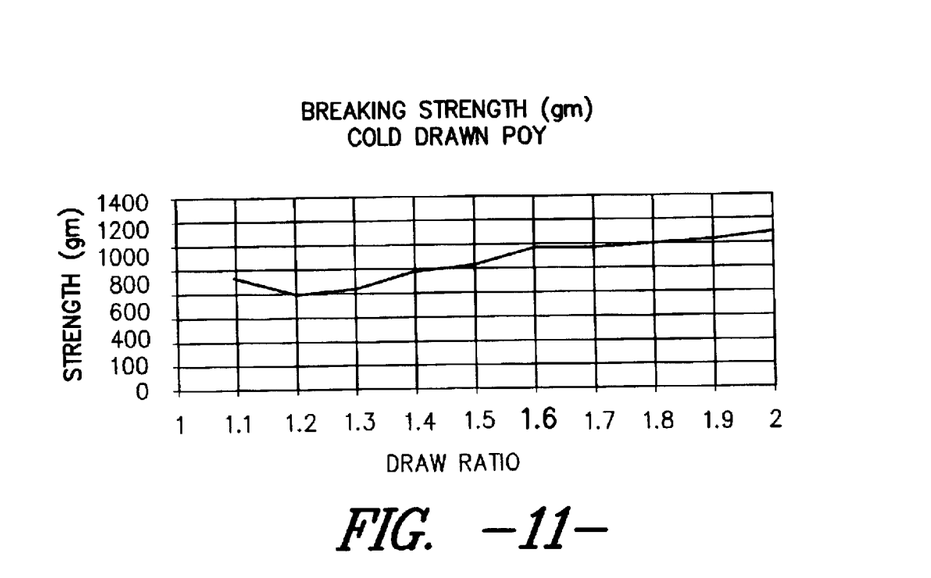
FIG. 11 illustrates breaking strength of the thread previously presented in relation to FIGS. 10–11.
Figure 12:
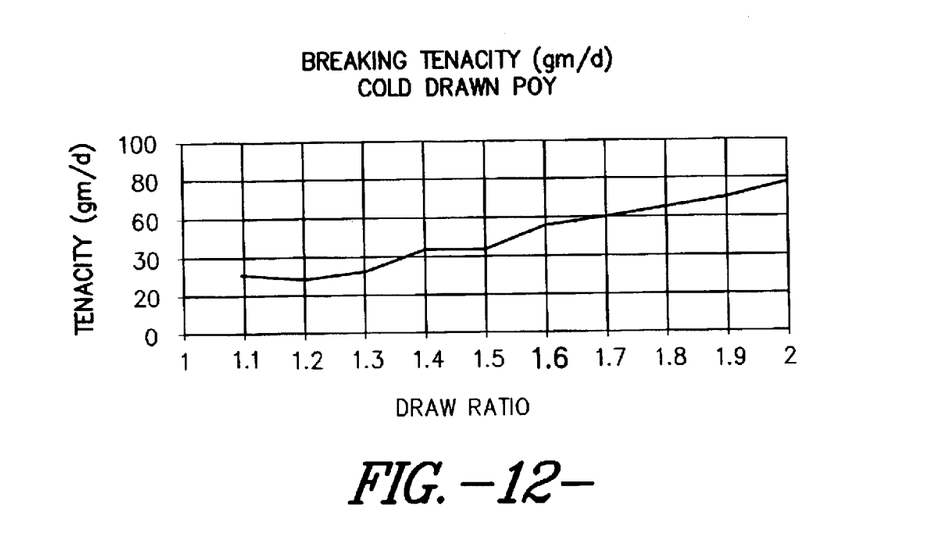
FIG. 12 graphically depicts breaking tenacity versus draw ratio for the same cold drawn thread of FIGS. 9–11.

Breaking elongation percentage results are reported in FIG. 10. Breaking strength results are reported in FIG. 11, and breaking tenacity is shown in FIG. 12.

Thread having an overall draw ratio of about 1.6 was employed in the construction which is shown in FIGS. 1–2, FIGS. 34, and in the Samples A, B, and C below, as further described.

SAMPLES

Product Samples were prepared for testing on the following multi-layered composite textile constructions. Each of the embodiments shown below as Sample A, B, and C differ from each other only with regard to the first textile substrate, or "backing" layer that is employed with each, as described.

Product Sample "A"

Heat Set Mesh Construction

A multi-layered manufactured composite camouflage construction was prepared as described above in connection with the invention, and shown as well in FIGS. 1–2. This product includes a first textile substrate (backing layer) of non-heat set printed Rachel knit which may be obtained from Royal Carolina.

The thread used along the multiple lines of attachment, or stitches, consisted of two-ply, high shrink Omara brand yarn which had been modified as described above. Thread having an overall draw ratio of about 1.6 was used.

The thread was applied as 2/150 denier that was inserted using two ends per needle, at a rate of about 10 stitches per inch.

The thread was inserted by stitching as described above in connection with FIGS. 5–9, and then shrink-hardened by heating as set forth above. The heater temperature at the heater was about 1100 degrees F., which resulted in a temperature on the fabric (and on the thread) of about 300–400 degrees F. After heating, the stitch count increased to about 11 stitches per seam inch, due to thread shrinkage, and hardening of the seam.

A single ply of the thread, when removed from the shrink-hardened seam of the multi-layered construction was found to be about 418 denier.

Product Sample "B"

Non-Heat Set Mesh Construction

A multi-layered manufactured composite camouflage construction as described above in connection with the invention. This product includes a first textile substrate (backing layer) of non-heat set printed Rachel knit ("Royal Carolina"). The fabric is printed and then heat set at 65 inches width prior to mating with a second textile substrate.

Thread was used along the multiple lines of attachment, or stitches. The thread was two-ply Omara brand yarn which had been cold drawn modified as described above. Thread having a draw ratio of about 1.6 was applied at 10 stitches per inch. The thread was applied as 2/150 denier that was inserted using two ends per needle.

Upon heating to the same temperatures as described above in connection with Sample A, the thread formed a shrink-hardened seam having about 11 stitches per linear inch of seam.

A single ply thread, when removed from the multi-layered construction after final heating, was found to be about 421 denier.

Product Sample "C"

Integral or Solid Base Fabric Construction

A multi-layered manufactured composite camouflage construction as described above in connection with the invention, and shown as well in connection with FIGS. 3–4 was constructed. The first textile substrate, or "base" fabric that is employed is a solid (not mesh) dyed polyester/cotton woven fabric.

The thread was used along the multiple lines of attachment, or stitches. The thread was Omara brand yarn described above. Heating was as previously described in connection with Samples A and B. The thread was applied as 2/150 denier and inserted using two ends per needle, resulting in 11 stitches per inch in the final product. A single ply of the thread, when removed from the multi-layered construction after final heating, was found to be about 417 denier.

Sample "D" —Commercial Product

Manufactured by Robinson Laboratories

Robinson Laboratories, Inc. of 110 North Park Drive, Cannon Falls, Minn. 55009 distributes commercially a camouflaged clothing product designated "3D REAL LEAF"™. A men's large (L) garment was tested.

Testing Procedure

Tensile Test (Grab): In executing the tensile test of specimens A, B, C and D, specimens were cut from the multi-layered camouflage construction into test strips along the stitched seam (in the machine direction). The seam was in the center of each cut specimen, and the specimen size was about 8 inches long (along the seam) in the machine direction, and 3 inches wide in the cross direction. Specimens were gripped by opposing clamps, and force was applied along the longitudinal length of the seam until breakage of the specimens. The test determined the force required to break the seam in the machine direction, and thus measures the relative strength of the construction along the stitched seam. Results are reported in Table 1.

Tensile Test of Thread: Tensile testing was conducted on thread removed from the stitches of manufactured samples A, B, C, and D. The thread was therefore de-stitched from the manufactured products, and then placed in the test apparatus to determine the force required to break the thread alone. Results are shown in Table 2.

Seam Failure: This test determines the maximum sewn seam strength which can be achieved when a force is applied perpendicular to the seam. Seam breakage at the stitch line is measured by taking each of the product samples A, B. C, and D and securing the outer leafy lobe (second textile substrate) to one test fixture, and the base fabric (first textile substrate) to a second test fixture. Then, force is applied in the cross-direction (perpendicular to the seam) by the fixtures until failure of the seam. Results are shown in Table 3.

TABLE 1

Tensile Test (Grab) of Sample Portions of Camouflage Construction Along Stitched Seam

| Sample | Force Required to Break-Peak Load Mean (lbf) | Percent Elongation at Peak Load (%) | Percent Elongation at 10 Lbs (%) |
| --- | --- | --- | --- |
| A | 110.312 | 44.736 | 14.286 |
| B | 90.960 | 46.737 | 14.410 |
| C | 84.342 | 25.016 | 6.890 |
| D | 92.037 | 71.252 | 23.517 |

Test Method ASTM D5034
Grip Separation 3.000 in.
Test Speed 12.000 in/min.
Five specimens per sample were averaged to obtain mean values set forth above.

TABLE 2

Tensile Results of Thread Portions From Manufactured Camouflage Construction

| Sample | Force Required to Break -- Peak Load lbf (Mean) | Percent Elongation at Peak Load (%) (Mean) |
| --- | --- | --- |
| A | 1.705 | 34.897 |
| B | 1.490 | 33.209 |
| C | 1.537 | 33.888 |
| D | 1.947 | 15.676 |

Test Method ASTM D2256
Gage Length 10.00 in.
Initial Speed 10.0 in/min.
Ten specimens per sample were averaged to obtain mean values set forth above.

Gage Length 10.00 in.
Initial Speed 10.0 in/min.
Ten specimens per sample were averaged to obtain mean values set forth above.

TABLE 3

Seam Failure of Manufactured Camouflage Construction by Forcible Separation of Two Textile Substrate Layers at the Seam

| Sample | Force Required to Break Peak Load lbf (Mean) | Percent Elongation at Peak Load (%) |
| --- | --- | --- |
| A | 48.979 | 43.675 |
| B | 65.485 | 54.867 |
| C | 46.464 | 30.618 |
| D | 21.827 | 33.414 |

Testing Method ASTM D1683
Grip Separation 3.000 in.
Test Speed 12.000 in/min.
Five specimens per sample were averaged to obtain mean values set forth above.

Brief Summary of Test Results

The tensile test results indicate that the various multi-layered camouflage constructions of the invention exhibit surprisingly good results for resisting elongation along the seam. In Table 1, it may be noted that all three examples of the invention (samples A, B, and C) resisted elongation along the seam significantly better than the sample D product.

Testing of the integrity of the seam (Table 3) indicated that the three embodiments of the invention exhibit surprisingly good results for seam integrity and strength. That is, the respective seams of samples A, B, and C resisted breakage substantially better than the seam of prior art sample D. All of the samples of the invention showed seam integrity up to at least 46 lbs of force. In fact, Sample B showed seam integrity up to a 65 lbs of force. The prior art sample D, however, failed at a relatively low force reading of only about 21 lbs of force.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A multi-layered camouflage construction comprising:
   (a) a first textile substrate, said first textile substrate having a first end and a second end,
   (b) a second textile substrate overlying said first textile substrate, said second textile substrate being secured to said first textile substrate along multiple lines of attachment, said multiple lines of attachment extending from said first end to said second end of said first textile substrate, said second textile substrate further comprising a plurality of lobes extending in a transverse direction to said multiple lines of attachment, at least one of said lobes having a base portion attached to said first textile substrate along one of said multiple lines of attachment and an outer wrinkled end portion free from said first textile substrate, said lobes being adapted to simulate the appearance of natural objects of a terrain, and
   (c) a shrink-hardened seam provided along the length of at least one of said multiple lines of attachment, said shrink-hardened seam comprising a first thread configured for securing said multiple line of attachment, said second textile substrate being gathered along said shrink-hardened seam.

2. The camouflage construction of claim 1 wherein said first thread of said seam is stitched at a rate of about 5 to about 20 stitches per inch of seam.

3. The camouflage construction of claim 1 wherein said first thread comprises a solution dyed thread.

4. The camouflage construction of claim 1 wherein said first thread comprises a solution dyed partially oriented yarn.

5. The camouflage construction of claim 1 wherein said first thread is between about 350 and 500 denier.

6. The camouflage construction of claim 1 wherein said first thread is between about 415 and about 421 denier.

7. The camouflage construction of claim 1 wherein said first thread comprises two plies.

8. The camouflage construction of claim 1 wherein said first thread comprises a twist of less than about 1 turn per inch.

9. The camouflage construction of claim 1 wherein said first thread is capable upon application of heat of shrinking at least about 50% in overall length.

10. The camouflage construction of claim 1 wherein said first thread comprises a material selected from the group of materials comprising: polyester, nylon, and polypropylene.

11. The camouflage construction of claim 1 wherein said first textile substrate comprises an open mesh net substrate.

12. The camouflage construction of claim 11 wherein said open mesh net substrate facilitates the movement of air through said camouflage construction.

13. The camouflage construction of claim 11 wherein said open mesh net substrate includes a camouflaged print pattern.

14. The camouflage construction of claim 11 wherein said open mesh net substrate is comprised of a material selected from the following materials: nylon, polypropylene, and polyester.

15. The camouflage construction of claim 11 wherein said open mesh net substrate is comprised of polyester.

16. The camouflage construction of claim 11 wherein said open mesh net substrate is comprised of nylon and polyester.

17. The camouflage construction of claim 1 wherein said first textile substrate comprises a solid textile of a cotton/polymer blend.

18. The construction of claim 1 wherein a defined spacing is provided between said multiple lines of attachment, said spacing being between about 1 and about 5 inches.

19. The camouflage construction of claim 1 wherein said shrink-hardened seam, when subjected to a longitudinal force along the length of said shrink-hardened seam, provides a percent elongation along its length which is no greater than about 47%.

20. The camouflage construction of claim 1 wherein said shrink-hardened seam is capable of resisting a force applied in the cross direction of said shrink-hardened seam of at least about 48 lbf.

21. The camouflage construction of claim 1 in which said shrink-hardened seam provides said first thread in a sewn stitch.

22. In an article of manufacture, a camouflage construction having first textile substrate connected to a second textile substrate along multiple stitched lines of attachment, said multiple stitched lines of attachment comprising shrink hardened seams, said shrink hardened seams comprising gathered portions of said second textile substrate along the length of said second textile substrate, said gathered portions forming a three-dimensional appearance in said second textile substrate, said shrink hardened seams further comprising a first thread, said first thread comprising a polymeric material, said second textile substrate further comprising a plurality of lobes extending in a transverse direction to said multiple lines of attachment, at least one of said lobes having a base portion attached to said first textile substrate along one of said multiple lines of attachment and an outer wrinkled end portion free from said first textile substrate, said lobes being adapted to simulate the appearance of natural objects of a terrain.

23. The article of claim 22 wherein said first thread of said hardened seam is stitched at a rate of about 5 to about 20 stitches per inch of seam.

24. The article of claim 22 wherein said first thread comprises a solution dyed partially oriented material.

25. The article of claim 22 wherein said first thread is between about 350 and 500 denier.

26. The article of claim 22 wherein said first thread is between about 415 and about 421 denier.

27. The article of claim 22 wherein said first thread comprises two plies.

28. The article of claim 22 wherein said first thread comprises a twist of less than about 1 turn per inch.

29. The article of claim 22 wherein said first thread is capable upon application of heat of shrinking at least about 50% in overall length to form said hardened seam.

30. The article of claim 22 wherein said first thread comprises polyester.

31. The article of claim 22 wherein said first textile substrate comprises an open mesh net substrate.

32. The article of claim 31 wherein said open mesh net substrate additionally comprises a dye.

33. The article of claim 31 wherein said open mesh net substrate includes a camouflaged print pattern.

34. The article of claim 31 wherein said open mesh net substrate is comprised of nylon.

35. The article of claim 31 wherein said open mesh net substrate is comprised of partially oriented polyester material.

36. The article of claim 31 wherein said open mesh net substrate is comprised of nylon and polyester.

37. The article of claim 22 wherein said first textile substrate comprises a solid textile of a cotton and polymer blend.

38. The article of claim 22 wherein a defined spacing is provided between said multiple lines of attachment, said spacing being between about 1 and about 5 inches.

39. The article of claim 22 wherein said shrink-hardened seam, when subjected to a longitudinal force along the length of said shrink-hardened seam, provides a percent elongation along its length which is no greater than about 47%.

40. The article of claim 22 wherein said shrink-hardened seam is capable of resisting a force applied in the cross direction of said shrink-hardened seam of at least about 48 lbf.

* * * * *